(12) United States Patent
Shen et al.

(10) Patent No.: US 7,574,562 B2
(45) Date of Patent: Aug. 11, 2009

(54) LATENCY-AWARE THREAD SCHEDULING IN NON-UNIFORM CACHE ARCHITECTURE SYSTEMS

(75) Inventors: Xiaowei Shen, Hopewell Junction, NY (US); Balaram Sinharoy, Poughkeepsie, NY (US); Robert W. Wisniewski, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 11/491,413

(22) Filed: Jul. 21, 2006

(65) Prior Publication Data
US 2009/0178052 A1    Jul. 9, 2009

(51) Int. Cl.
*G06F 12/02*    (2006.01)
(52) U.S. Cl. .................................. 711/118; 711/119
(58) Field of Classification Search ........................ None
See application file for complete search history.

(56) References Cited

U.S. PATENT DOCUMENTS

| | | | | |
|---|---|---|---|---|
| 4,445,172 A | * | 4/1984 | Peters et al. | 711/3 |
| 5,210,843 A | * | 5/1993 | Ayers | 711/128 |
| 5,875,470 A | * | 2/1999 | Dreibelbis et al. | 711/147 |
| 6,578,065 B1 | | 6/2003 | Aglietti et al. | |

* cited by examiner

*Primary Examiner*—Than Nguyen
(74) *Attorney, Agent, or Firm*—Scully, Scott, Murphy & Presser, P.C.; Daniel P. Morris, Esq.

(57) ABSTRACT

A system and method for latency-aware thread scheduling in non-uniform cache architecture are provided. Instructions may be provided to the hardware specifying in which banks to store data. Information as to which banks store which data may also be provided, for example, by the hardware. This information may be used to schedule threads on one or more cores. A selected bank in cache memory may be reserved strictly for selected data.

3 Claims, 3 Drawing Sheets

| ADDRESS RANGE | BANK |
|---|---|
| 0x1000000<br>0x2000000 | 3 |
| 0x3000000<br>0x4000000 | 5 |
|  |  |
|  |  |

202 — address range column label
204 — bank column (3)
206 — address range (0x3000000–0x4000000)
208 — bank column (5)

FIG. 3

| ADDRESS RANGE | BANK |
|---|---|
| 0x5000000<br>0x6000000 | 2 |
| 0x1000000<br>0x2000000 | 3 |
| 0x3000000<br>0x4000000 | 5 |
| . . . | . . . |

302 — ADDRESS RANGE
304 — BANK
300

LATENCY-AWARE THREAD SCHEDULING IN NON-UNIFORM CACHE ARCHITECTURE SYSTEMS

STATEMENT REGARDING FEDERALLY SPONSORED RESEARCH OR DEVELOPMENT

This invention was made with Government support under Contract No.:NBCH020056 (DARPA) awarded by Defense, Advanced Research Projects Agency. The Government has certain rights in this invention.

FIELD OF THE INVENTION

The present disclosure generally relates to computer processing and particularly to operating systems, thread scheduling, and cache architectures.

BACKGROUND OF THE INVENTION

In systems that utilize non-uniform memory access or the like, memory access time depends on the memory location relative to a processor. As caches have grown larger, this non-uniform access time, which typically previously referred to memory, will also apply to on-chip cache. For instance, under NUCA (non-uniform cache architecture) a particular core on a processor can access cache lines nearer to it faster than cache lines stored further away. Different cores on the a given chip will have different cache lines they are close to and different ones that are further away. Such systems introduce uncertainty into the time that it takes to fetch a cache line. This behavior is undesirable for several reasons. For one, some applications are important or have high priority. Those applications should be able to have their cache lines stored in the closer part of the cache that takes fewer cycles to access. For another, some applications need predictable performance. For example, it may be better for a real-time application to have a predictable cycle time such as 5 cycles for all of its cache accesses than to have a variable cycle times such as 1 cycle for some, 2 cycles for others, 8 cycles for yet others, etc., even if the average cycle time for all accesses results in less than the predictable 5 cycle time.

Further, in a core with multiple processing elements (PEs), different PEs have different access times to the cache lines. For instance, it may take PE 0 1 cycle to access line X and 5 cycles to access line Y, while for PE 1 line X takes 5 cycles and line Y takes 1 cycle to access. In this scenario, it is preferable to place PE 0's data in line X and PE 1's data in line Y.

A bank generally refers to all lines in a cache that may be accessed in the same number of cycles. Different PEs and cores are likely to have different bank sizes. The current cache technology does not allow control over in which banks data may be stored. In addition, there is no mechanism in the conventional cache techniques to provide feedback to the software or operating systems as to the banks where particular cache lines are stored. An application may not want its data to be scattered throughout the cache such that access times to that data becomes irregular, that is, some accesses become more expensive than others. Rather, it would be desirable to able to specify that for a given thread its data be stored in a particular bank that would take a desired amount of access time, for example, between 10-12 cycles to fetch. Therefore, what is needed is a method and system that enables placing of cache lines in selected banks. It is also desirable to have a method and system that provides information as to which bank locations cache lines are stored.

BRIEF SUMMARY OF THE INVENTION

A system and method for latency-aware thread scheduling in non-uniform cache architecture are provided. The system in one aspect includes one or more cores operable to run one or more threads and a plurality of banks in cache memory accessible by applications that run on one or more cores. The system also includes one or more memory locations for storing at least a specification identifying in which bank of the plurality of banks to store data. A hardware controller is operable to store data into a selected bank according to the specification.

In one aspect, an operating system or the like may specify the specification identifying in which bank of the plurality of banks to store data. The specification may be provided based on one or more policies associated with scheduling. The one or more policies may include storing data in a bank having low bank access time from a core running a selected application.

The one or more memory locations may further include bank information identifying what data is stored in which bank of the plurality of banks. The bank information may be used to schedule one or more threads on one or more cores, for instance, to provide service of guarantees. The one or more memory locations may also include reservation information identifying one or more banks of the plurality of banks to reserve for selected data. In another aspect, the hardware controller is operable to store the data in a next nearest bank if the hardware controller is unable to store the data in the selected bank.

A method for latency-aware thread scheduling in non-uniform cache architecture in one aspect may include identifying in which bank of a plurality of banks in cache memory to store data using a specification communicated by an operating system and storing the data into the identified bank. The method may also include providing bank information identifying what data is stored in which bank of the plurality of banks.

In another aspect, a method for latency-aware thread scheduling in non-uniform cache may include reading bank information identifying what data is stored in which bank of the plurality of banks and using the bank information to schedule one or more threads on one or more cores. The method may further include specifying to the hardware in which bank of a plurality of banks in cache memory to store data. The method may also include reserving one or more banks for selected data.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 2 is an example of a table, which the operating system or the like may fill in with entries to instruct the hardware in which data banks data should be stored in one embodiment of the present disclosure.

FIG. 3 shows an example of the cache bank information that the hardware provides in one embodiment of the present disclosure.

DETAILED DESCRIPTION

An exemplary embodiment of the present disclosure allows specifying the banks in cache memory in which to store data for given applications or threads, and also provides an ability to query the hardware to determine what data is stored in which banks of cache memory. For example, an operating system or software or the like may instruct the hardware to place selected data for a particular thread or application in a selected bank. This hardware will make a best effort to place the data in that cache bank, otherwise will place it in the nearest non-specified-exclusive bank available. Controlling where data are placed allows placing high-priority applications' data in banks that require fewer cycles to access. The hardware also may provide the operating system, software or the like information as to what data are placed in which banks. The operating system, software or the like may use the information to, for example, make scheduling decisions, provide quality of service guarantees, or otherwise provide reason about the performance of accessing the cached data.

Figure 1:
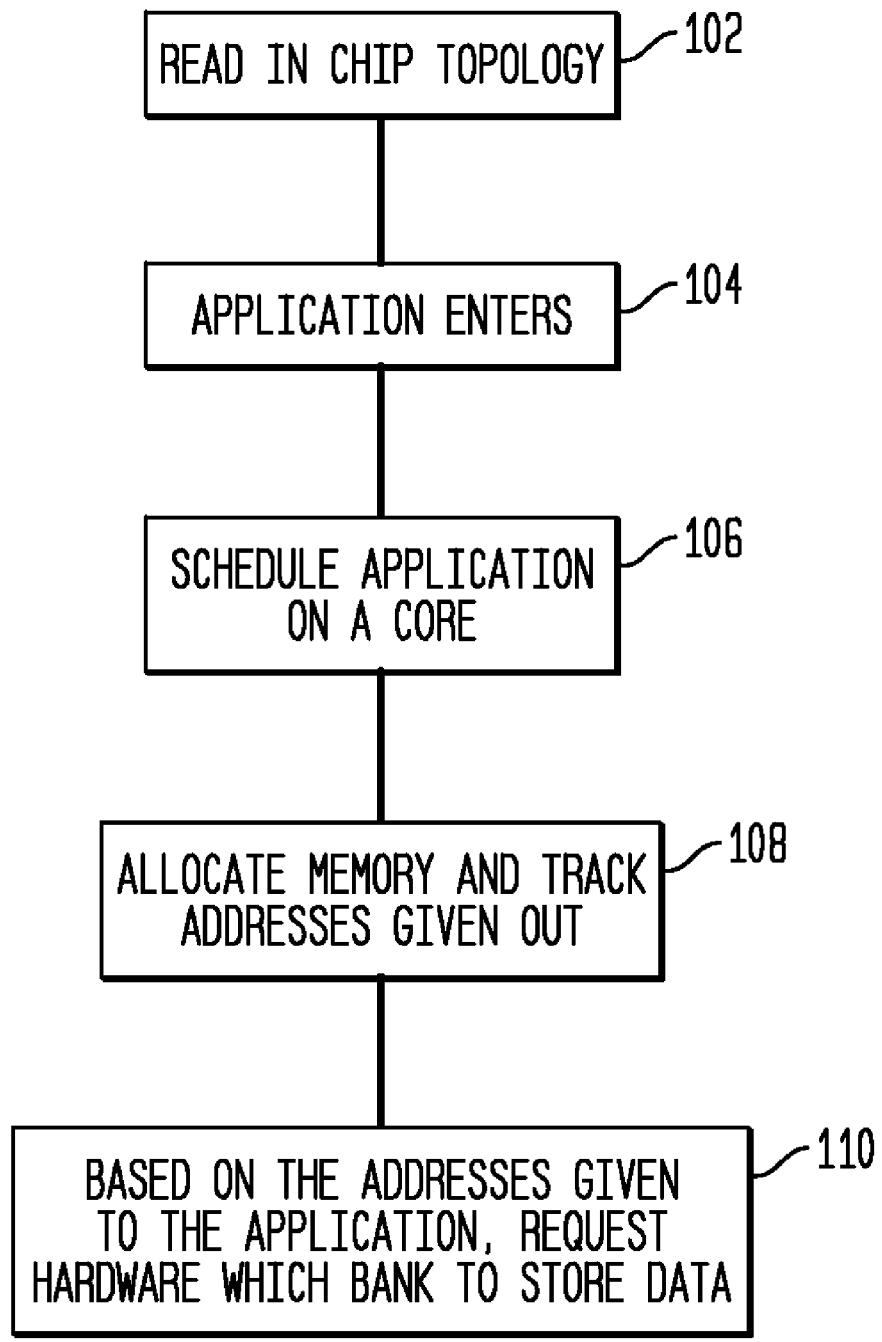
FIG. 1 is flow diagram illustrating a method for interacting with cache memory in one embodiment of the present disclosure.

FIG. 1 is flow diagram illustrating a method for storing data into selected banks in one embodiment of the present disclosure. At 102, an operating system or software or the like reads information pertaining to processor chip topology, for example, the physical layout of one or more processor cores and cache memory such as the L2 and/or L3 cache on a processor chip on which it will be running applications and threads. The information may include but is not limited to core layout, bank information, access time between cores and banks. The operating system for example may read this information during the boot time. In one embodiment of the present disclosure, the hardware characterizes and provides this information, for instance, as a form of firmware. In an exemplary embodiment of the present disclosure, the information contains bank-core pair data that describes how long it takes to access data in that bank from that core.

At 104, an application enters the system. That is, an application is started. At 106, the operating system or the like schedules the application on a core. At 108, the operating system allocates memory and tracks addresses given out to the application. For instance, the application may need 1 megabyte of data to be brought into cache memory. In response to the application's requirements, the operating system may allocate a range of virtual addresses corresponding to that data. In an exemplary embodiment of the present disclosure, the operating system, based on the addresses it gives to the application, instructs the hardware to store data associated with this address range in a selected bank in cache memory. The operating system may provide the instruction at 110, for instance, by filling in an entry in a memory location where the hardware can access it.

FIG. 2 is an example of a table, which the operating system or the like may fill in with entries to instruct the hardware in which cache banks data should be stored. The entries in the table 200 may include an address range 202, 206 and a bank identifier 204, 208. The entries specify to the hardware in which bank the corresponding address range should be stored. For instance, address range of 0x1000000 to 0x2000000 (202) should be stored in bank 3 (204). Likewise, address range of 0x3000000 to 0x4000000 (206) should be stored in bank 5 (208). The operating may specify additional ranges of addresses and bank identifiers in the similar manner, by filling in the entries in the table 200, which the hardware may access when placing data in cache memory. The table 200 may be stored in memory registers such as latches, DRAM (dynamic random access memory), SRAM (static random access memory), or any other known or will be known device capable of holding data.

The operating system or the like may determine one or more banks to place selected address ranges based on its analysis of the type of application that is using the address range, the chip topology and the bank-core pair information which it read in at step 102, for example, during system boot time. For instance, for high-priority applications, the operating system or the like may select to place the data in a bank where the data can be accessed with fewer cycles from the core on which the application is running. As another example, for the core that the operating system is running on, a small bank with low access time (that is, fewer cycles to access) from the core may be reserved for crucial operating system instructions, such as those for interrupt processing. This enables keeping operating system instructions, or at least the low-level instructions, in close L2 cache. Different policies and reasoning may be used to determine or reserve banks for different applications.

The ability to specify where data should be placed allows the operating system or the like to be able to provide quality of service or predictable access to the cache for applications that require such guarantees. For instance, quality of service guarantees can be provided if the operating system is careful to make requests for cache banks such that it reserves enough space in a given cache bank for a thread's data.

Another aspect of the exemplary embodiment allows the operating system or software or the like to query the location of a given set of cache lines. For instance, the hardware may store in a memory area that is accessible by the operating system or software or the like, the information about the bank a given address is placed. The operating system or the like may verify that the cache bank requests are being satisfied using this query mechanism. In addition, the information may be used to make scheduling decisions and provide quality of service guarantees.

FIG. 3 is an example of the information that the hardware provides. In one embodiment, the information may include address range 302 and the bank identifier 304 where the hardware stored that address range. In one embodiment, the table 300 providing the information may be stored in memory registers such as latches, DRAM (dynamic random access memory), SRAM (static random access memory), or any other known or will-be-known device capable of holding data.

The operating system or the like may use the information in the table 300 to determine where the hardware placed the data for a given application or thread. The operating system or the like may verify that the cache bank requests are being satisfied by looking up the table for the requested address range and corresponding bank identifier. The information is also useful for example in estimating how costly it would be for a given application to run. In another embodiment, the information may be used to schedule applications or threads. For instance, knowing that a given application's cache lines are stored in a bank such that they are closer to a given core or PE allows the operating system or the like to schedule that application's thread on that core. In general, if an operating system or the like is aware of what bank an application's cache lines are in, it can make better scheduling and placement decisions.

It may be that attempting to have the operating system or the like track enough information to specify the bank placement for all data for all threads would be too expensive. Therefore, in one embodiment of the present disclosure, most data may still be placed by the hardware. Thus, for example, the memory shown in FIG. 2 need not be filled in with each memory allocated or with each bank in the memory system. The address range for which the operating system does not explicitly specify or request a bank, it is left to the hardware to select a bank to place that data.

In addition, the hardware may override the requests for banks, for example, because it may not be able to accommodate the requests. For instance, if the operating system requested more lines to be at a bank than it is able to fit, the hardware will not be able to fulfill the request. The hardware may in such cases store the data in the bank near the requested bank.

Figure 4:
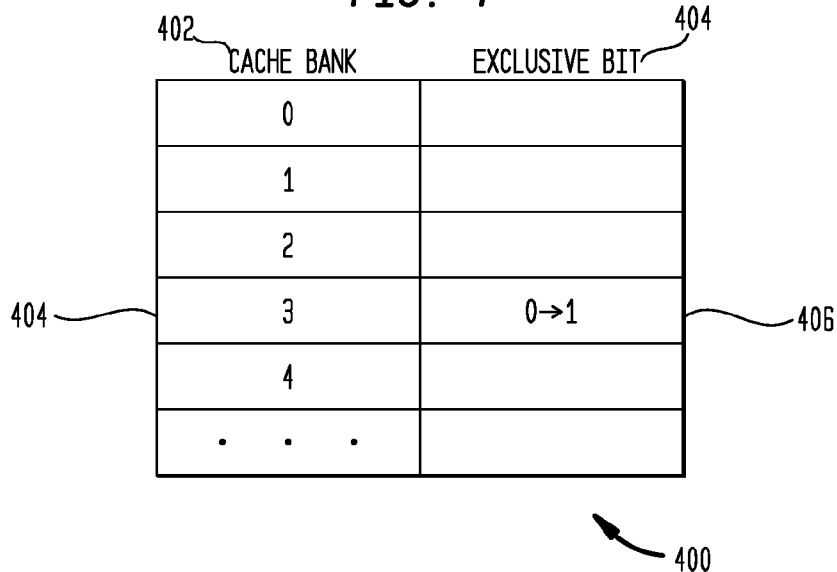
FIG. 4 illustrates memory storage which may be used to communicate that selected banks be reserved in one embodiment of the present disclosure.

In another embodiment of the present disclosure, a communication mechanism is provided to allow the operating system or the like to exclusively reserve cache banks. FIG. 4 illustrates memory storage 400 which may be used to reserve selected banks. FIG. 4 is shown for example purpose only. Other formats or mechanisms may be used to convey the reservation information. In one embodiment, each cache bank 402 has associated exclusive bit 404, which may be turned on and off to indicate that a given cache bank should be strictly reserved for the address range the operating system specified to the hardware, for instance, using the memory such as the table shown in FIG. 2. For example, the exclusive bit being set to 1 (FIG. 4 at 406) associated with cache bank 3 (FIG. 4 at 404) indicates to the hardware that cache bank 3 be reserved strictly for the address range 0x1000000 to 0x2000000 (202 and 204 at FIG. 2). This reservation mechanism allows the operating system or the like to control to an extent what hardware may and may not put into selected banks. Such mechanism is useful in providing quality of service (QOS) guarantees to applications that require it. In one embodiment, the information such as the table shown in FIG. 4 may be stored in memory registers such as latches, DRAM (dynamic random access memory), SRAM (static random access memory), or any other known or will-be-known device capable of holding data.

Figure 5:
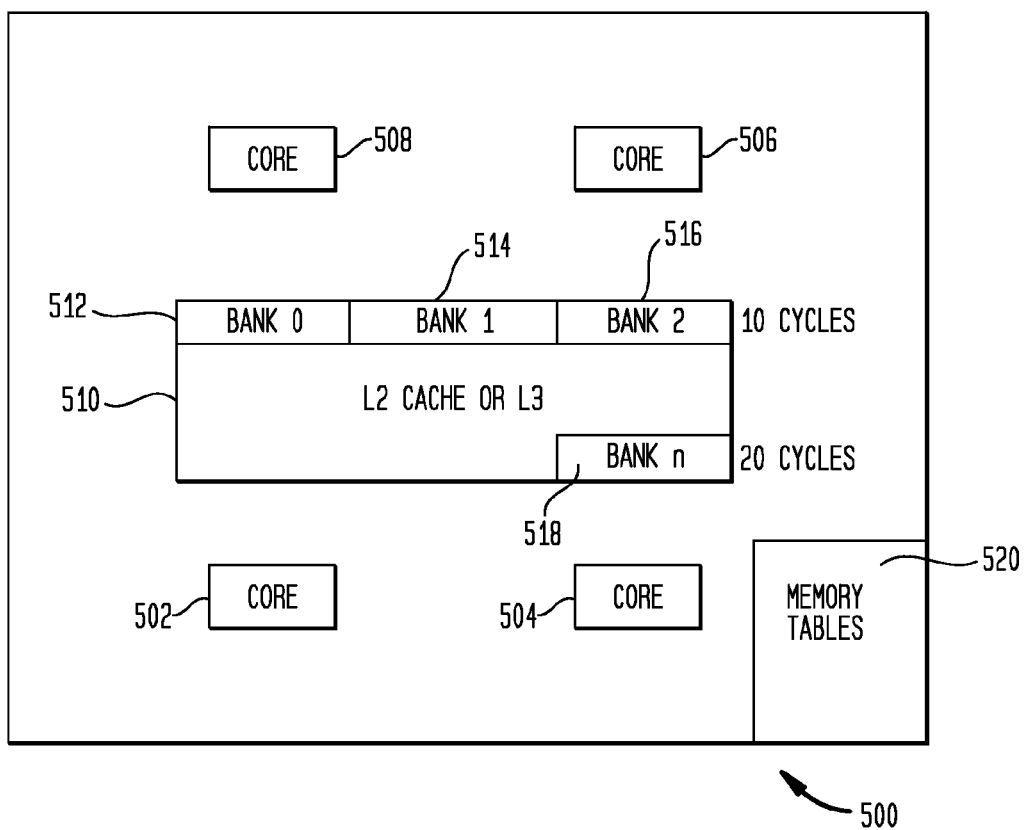
FIG. 5 is a block diagram illustrating a plurality of processing components for interacting with cache memory to enable latency-aware thread scheduling in one embodiment of the present disclosure.

FIG. 5 is a block diagram illustrating processing components in one embodiment of the present disclosure. A processor chip 500 may include a plurality of cores 502, 504, 506, 508. One or more applications run on a core. A core in general is enabled to handle and process thread executions and may include a set of processing components such as functional units, cache memory, etc. Functional units on the core may include but is not limited to units such as one or more floating point units (FPU), integer units, arithmetic and logic units (ALU), registers, decoders, shifters, load-store units, etc., enabled to process thread executions. The processor chip 500 also may include cache memory such as the L2 or L3 cache 510. The cache 510 is divided into a plurality of banks 512, 514, 516, 518, etc. A bank is characterized in that all addresses stored in the bank take the same number of cycles to access. It is usually the case that the access times from various cores to the same bank are different and the access times from a given core to various banks are different, for example, due to the physical layout on the chip and/or the way the memory controller works. For instance, it may take an application running on the core at 506 10 cycles to fetch data stored in bank 2 at 516, while it may take the core at 504 20 cycles to access the same bank 2 at 516. Furthermore, for an application running on the core at 506, it may 20 cycles to fetch data stored in bank n at 518.

In an exemplary embodiment of the present disclosure, the operating system, software or the like specifies which bank cache lines to store data, determines the banks that data are placed in, and reserves banks for selected data, using, for example, a read/write memory 520. Any other known or will-be-known mechanism, method, or device may be used for communicating such information. In one embodiment of the present disclosure, the operating system or the like may use that information to schedule a thread. For instance, knowing that a given application's cache lines are stored in bank 2 at 516 allows the operating system or the like to schedule that application's thread on a core that has fewer access times to that bank such as the core at 506, rather than the core at 518. In general, if an operating system or the like is aware of what bank an application's cache lines are in, it can make better scheduling and placement decisions.

An operating system or the like also may specify or make a request as to in which bank cache lines should be stored using memory 520. This allows, for example, an operating system to have critical code and data placed at a bank that requires fewer cycles to access. In addition, by allowing control over which bank to place data in, an operating system or the like may provide applications with high priority access to low banks (for example, those that are accessed in fewer cycles).

Furthermore, this control allows the operating system to be able to provide quality of service or predictable access to the cache for applications that require such guarantees. Quality of service guarantees can be provided if the operating system is careful to make requests for cache banks such that it reserves enough space in a given cache bank for a thread's cache data. The operating system or the like may verify that cache bank requests are being satisfied by looking up the information in memory at 520.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for latency-aware thread scheduling in non-uniform cache architecture, comprising:
   one or more cores operable to run one or more threads;
   a plurality of banks in cache memory;
   one or more memory locations including at least specification identifying in which bank of the plurality of banks to store data;
   hardware controller operable to store data into a selected bank according to the specification, wherein the hardware controller is operable to store the data in a next nearest bank if the hardware controller is unable to store the data in the selected bank.

2. The system of claim 1, wherein the specification is provided based on one or more policies associated with scheduling one or more threads.

3. The system of claim 2, wherein the one or more policies include storing data in a bank having low bank access time from a core running a selected application.

* * * * *